(12) United States Patent
Sinha et al.

(10) Patent No.: US 11,050,707 B2
(45) Date of Patent: Jun. 29, 2021

(54) SYSTEMS AND METHODS FOR UPDATING A RESOURCE ADDRESS

(71) Applicant: Charter Communications Operating, LLC, St. Louis, MO (US)

(72) Inventors: Ashutosh Kumar Sinha, Centennial, CO (US); Robert Dianda, Colorado Springs, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 21 days.

(21) Appl. No.: 16/658,717

(22) Filed: Oct. 21, 2019

(65) Prior Publication Data
US 2021/0119960 A1    Apr. 22, 2021

(51) Int. Cl.
*H04L 29/12* (2006.01)

(52) U.S. Cl.
CPC .... *H04L 61/1511* (2013.01); *H04L 29/12066* (2013.01); *H04L 61/2053* (2013.01); *H04L 61/2076* (2013.01)

(58) Field of Classification Search
CPC ........... H04L 61/1511; H04L 29/12066; H04L 29/12301; H04L 61/2076
See application file for complete search history.

(56) References Cited

U.S. PATENT DOCUMENTS

| | | | |
|---|---|---|---|
| 8,463,915 B1 * | 6/2013 | Kim | H04L 61/1511 709/227 |
| 10,003,567 B1 * | 6/2018 | Avirneni | H04L 61/2007 |
| 10,044,629 B1 | 8/2018 | Raftery | |
| 2004/0078487 A1 * | 4/2004 | Cernohous | H04L 67/1019 709/245 |
| 2006/0101113 A1 * | 5/2006 | Lemson | G06Q 10/107 709/203 |
| 2007/0165542 A1 * | 7/2007 | Shin | H04L 61/1511 370/254 |
| 2011/0142048 A1 * | 6/2011 | Yoon | H04W 72/02 370/392 |
| 2014/0068043 A1 * | 3/2014 | Archbold | H04L 61/1511 709/223 |
| 2015/0237001 A1 * | 8/2015 | Ivanov | H04L 61/10 709/245 |
| 2021/0067480 A1 * | 3/2021 | Goel | H04L 61/10 |

* cited by examiner

*Primary Examiner* — Jeong S Park
(74) *Attorney, Agent, or Firm* — The Marbury Law Group, PLLC (57) ABSTRACT

Various embodiments include computing devices and methods for updating a resource address. A processor of a computing device may receive a request for a resource address from a second computing device. The processor may send to the second computing device the resource address and a time-to-live for the resource address. The processor may determine that the resource address has changed within the time-to-live. The processor may send the changed resource address to the second computing device.

15 Claims, 10 Drawing Sheets

| DCRequestCache Table | | | |
|---|---|---|---|
| DNS Client Address | Requested Entry | Response Sent Time (e.g., Unix Epoch Time) | TTL |
| 192.168.1.24 | Google.com | 1566590485 | 86400 |

SYSTEMS AND METHODS FOR UPDATING A RESOURCE ADDRESS

BACKGROUND

The Domain Name System (DNS) is a hierarchical and decentralized naming system for computers, services, or other resources connected to a communication network, such as the Internet. The DNS associates various information with domain names assigned to each of the participating entities. The DNS translates more readily memorized domain names to unique numerical addresses, such as Internet Protocol addresses, for locating and identifying computer services and devices with the underlying network protocols.

Client computing devices attempting to locate a resource on a communication network may send a query to a DNS server, which responds with a DNS response. Communication network elements typically cache DNS responses for a certain duration, such as a time-to-live value specified by the DNS server.

Resource addresses may change from time to time. Thus, a client computing device that has previously accessed a particular resource at a particular address may be unaware of the changed address when the client computing device subsequently requests the resource. This problem may be exacerbated in a cloud-based environment in which resources are made available on demand, because such resources may be re-assigned different addresses on a more frequent basis. In a case where a client computing device re-requests a resource whose address has changed during the assigned time-to-live value, significant delay may be incurred by the processes that are required to determine the changed resource address.

SUMMARY

Various aspects include methods that may be implemented on a processor of a computing device for updating a resource address. Various embodiments may include receiving a request for a resource address from a second computing device, sending to the second computing device the resource address and a time-to-live for the resource address, determining that the resource address has changed within the time-to-live, and sending the changed resource address to the second computing device.

Some embodiments may include associating an identifier of the second computing device with the requested resource address, and storing in a data structure the identifier of the second computing device, the requested resource address, the time-to-live, and a time the resource address was sent. In some embodiments, the identifier of the second computing device may include a network address of the second computing device. In some embodiments, determining that the resource address has changed within the time-to-live may include receiving from a third computing device the changed resource address.

In some embodiments, sending to the second computing device the changed resource address may include sending to the second computing device a notification that the resource address has changed, receiving from the second computing device a request for the changed resource address, and sending to the second computing device the changed resource address in response to the request for the changed resource address. In some embodiments, the computing device may include a domain name server (DNS) network element.

Various aspects further include a computing device having a processor configured with processor executable instructions to perform operations of any of the methods summarized above. Various aspects further include a processing device for use in a computing device and configured to perform operations of any of the methods summarized above. Various aspects include a computing device having means for performing functions of any of the methods summarized above. Various aspects include a non-transitory processor-readable storage medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium. A wireless device also may be referred to as an access terminal, a terminal, a mobile station, a wireless communication device, a handheld device, a subscriber unit, a station, etc.

A computing device may seek to utilize a wide variety of resources connected to the computing device through a communication network. The address assigned to each respective resource sought by the computing device may change from time to time. In particular, network resources may change an address at which they may be accessed. For example, on-demand network resources (e.g., IoT devices) may frequently disconnect from a communication network and be assigned a different resource address upon re-connection to the communication network. However, a computing device that has previously accessed a particular resource at a particular address may be unaware of the newly assigned resource address when the computing device subsequently requests the resource. This problem is exacerbated in a cloud-based environment in which resources are made available on demand, because such resources may be assigned different addresses more frequently.

To reduce some of the delay that may result from the repeated attempts to access a network resource, network elements may store received DNS responses for a period of time. For example, a network element may cache a DNS request response for time-to-live (TTL) value specified by a DNS server. When a resource address is changed, the DNS server is typically notified to update its records (e.g., a DNS zone file or a similar data structure). However, after the DNS server records (e.g., DNS zone file) is updated, DNS clients (i.e., client computing devices) are not notified of the resource address change until the DNS client attempts to re-access the network resource. Inaccurate resource records may cause delays in accessing network resources that may be propagated and magnified across a communication network. Further, frequently changing resource records may impose a burden on network elements that cache and update resource records, such as DNS servers of network service providers.

To address these problems, various embodiments include methods that may be implemented on a processor of a computing device to update a resource address. In some embodiments, a first computing device may be configured to proactively notify a second computing device that a resource address has changed. In this manner, the second computing device may avoid repeated attempts to access a network resource using an outdated resource address.

In various embodiments, a first computing device may receive a request for resource address from the second computing device. In some embodiments, the first computing device may send to the second computing device a resource address and a TTL for the resource address. The TTL may indicate a duration of validity or usefulness of the resource address. In some embodiments, the first computing device may determine that the resource has changed status during or within the TTL. For example, the resource may have disconnected from the communication network. The resource may subsequently reestablish a connection with the communication network. Such reestablishment may result in a new or changed address for the resource that has reestablished a connection with the communication network. In some embodiments, the first computing device may send the changed resource address to the second computing device. In some embodiments, the first computing device may include a DNS network element.

In some embodiments, sending the changed resource address to the second computing device may include sending a notification to the second computing device that the resource address has changed, receiving a request for the changed resource address from the second computing device, and sending the changed resource address to the second computing device.

In some embodiments, the first computing device may associate an identifier of the second computing device with the requested resource address, and may store in a data structure the identifier of the second computing device, the requested resource address, the TTL, and a time that the resource address was sent to the second computing device. In some embodiments, the identifier of the second computing device may include a network address of the second computing device. In some embodiments, the first computing device may determine that the resource address for a particular resource has changed within the TTL based on a notification from a third computing device that the particular resource address has changed. For example, the first computing device may receive a resource address update (e.g., a DNS update) from the third computing device.

The various embodiments may be implemented in components of an IP multimedia subsystem (IMS). For example, a Media Gateway Control Function (MGCF) may receive a terminating call (e.g., a break-in call) for a network resource. The MGCF may send resource network query (e.g., a DNS query) to a network resource server requesting a resource address of a network element to which to route the call (e.g., a resource address of an Interrogating CSCF (I-CSCF)). The network resource server may respond with a resource address (e.g., an IP Address of the I-CSCF) and a TTL value (e.g., 86400 second, or 24 hours), and the MGCF may cache this information. In the event that I-CSCF is taken out of service or goes down, the network resource server may be updated with a new resource address for the I-CSCF. The network resource server may determine whether the new resource address has been received within the TTL value. In response to determining that the new resource address has been received within the TTL value, the network resource server may send a notification message to the MGCF indicating that the resource address has changed. In some implementations, the network resource server may send the new resource address to the MGCF in addition to or as an alternative to the notification message.

Figure 1:
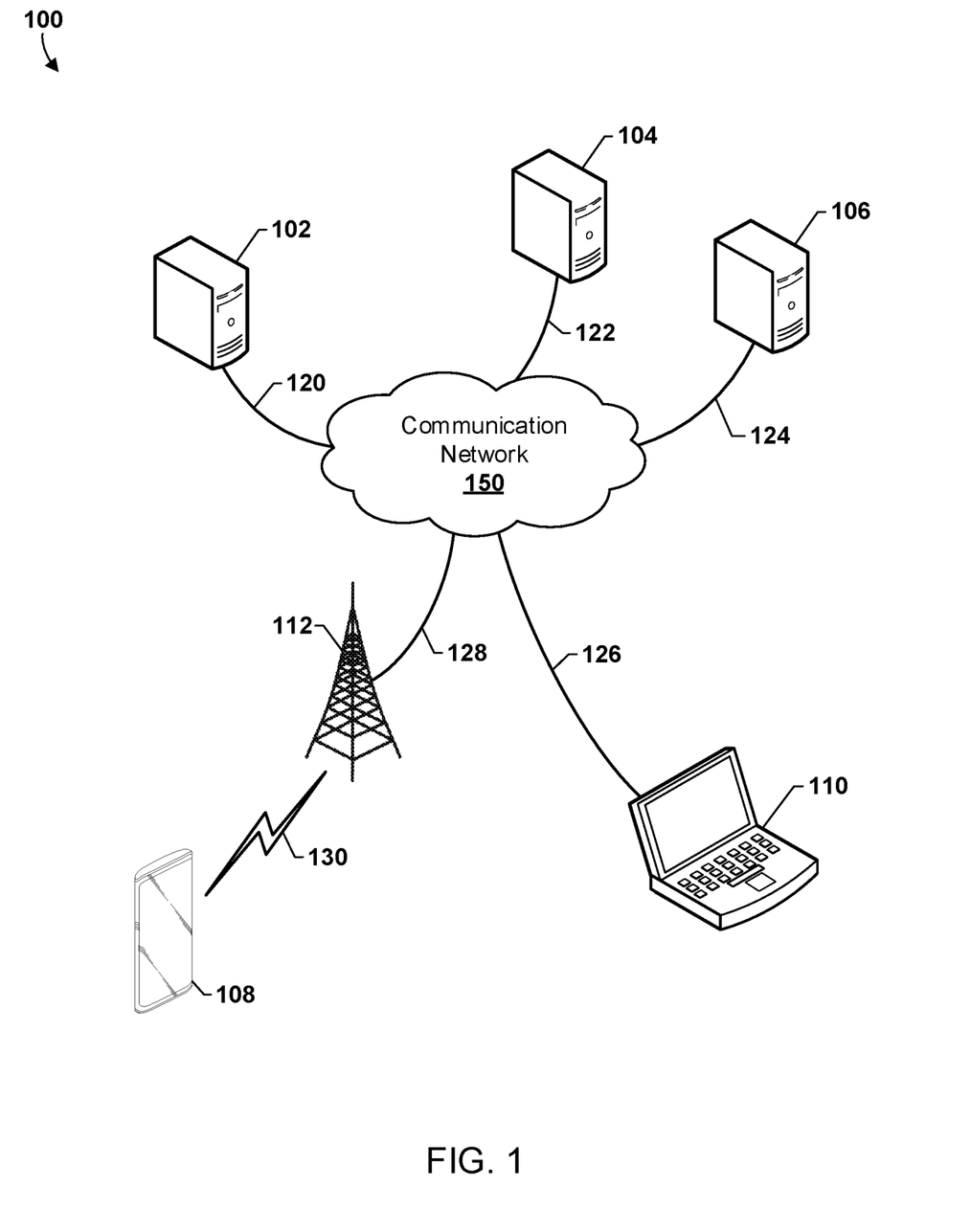
FIG. 1 is a system block diagram of a communication system according to various embodiments.

Various embodiments may be implemented within a variety of communication systems 100, an example of which is illustrated in FIG. 1. With reference to FIG. 1, the communication system 100 may include network elements 102, 104, 106, a portable computing device 110, a mobile computing device 108, and a communication network 150. The communication network 150 may provide access to one or more wireless devices (not shown) via an access point or base station 112, which may communicate with the communication network 150 over a wired or wireless communication link 128 which may include a communications backhaul to the communication network 150. The network elements 102, 104, 106 may communicate with the communication network 150 over a wired or wireless communication link 120, 122, 124, respectively. The portable computing device 110 may communicate with the communication network 150 over a wired or wireless communication link 126. The mobile computing device 108 may communicate with the base station 112 over a wireless communication link 130. The base station 112 may include base stations (e.g., 112) configured to provide wireless communications over a wide area (e.g., macro cells), as well as small cells, which may include a micro cell, a femto cell, a pico cell, and other similar network access points. The communication network 150 may include one or more network elements, such as servers and other similar devices (not illustrated).

While the network elements 102, 104, and 106 are each illustrated as a single network element for conciseness, each of the network elements 102, 104, and 106 may include one or more discrete or virtual network elements. Further, the communication system 100 may include additional network elements.

The network element 102 may be configured to function as a DNS network element (e.g., a DNS server). The DNS network element 102 may maintain information about a domain structure and network addresses assigned to various network resources. The DNS network element 102 may be configured to respond to queries for network addresses of network resources.

The DNS network element 104 may be configured to perform DNS administration or DNS update functions. In some implementations, the DNS network element 104 may be configured to function as a DNS administrator, which may update or modify DNS information such as resource addresses, name-to-address resolutions, DNS zone files, and other such information. In some implementations, the DNS network element 104 may provide updated or modify DNS information to other DNS network elements (e.g., the DNS network element 102). In some embodiments, the network element 104 may be configured to function as a DNS network element (e.g., a DNS server).

The DNS network element 106 may be configured to function as a network resource and/or to provide a network function or service. In some implementations, the DNS network element 106 may be configured to provide, or to provide access to, a network resource such as a service, an application, a document, and the like. The DNS network element 106 may be configured to function as part of an IP multimedia subsystem (IMS). The IMS may include one or more network elements such as a Call Session Control Function (CSCF), which may be divided into logical elements such as a Proxy CSCF (P-CSCF), Interrogating CSCF (I-CSCF), Serving CSCF (S-CSCF); a Home Subscriber Server (HSS); a Media Gateway (MGW); a Media Gateway Control Function (MGCF); and one or more Application Servers (AS). In some embodiments, the network element 106 may be configured to function as a DNS network element (e.g., a DNS server).

In some implementations, the mobile computing device 108, the portable computing device 110, and/or the DNS network element 106 may be configured to function as a DNS client computing device. A DNS client computing device may send a request for a resource address (e.g., a DNS request) to a DNS network element configured to provide the requested resource address (e.g., the DNS network element 102).

The wireless and/or wired communication links 120, 122, 124, and 126 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 120, 122, 124, and 126 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth® standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof. Wired communication protocols may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

Figure 2:
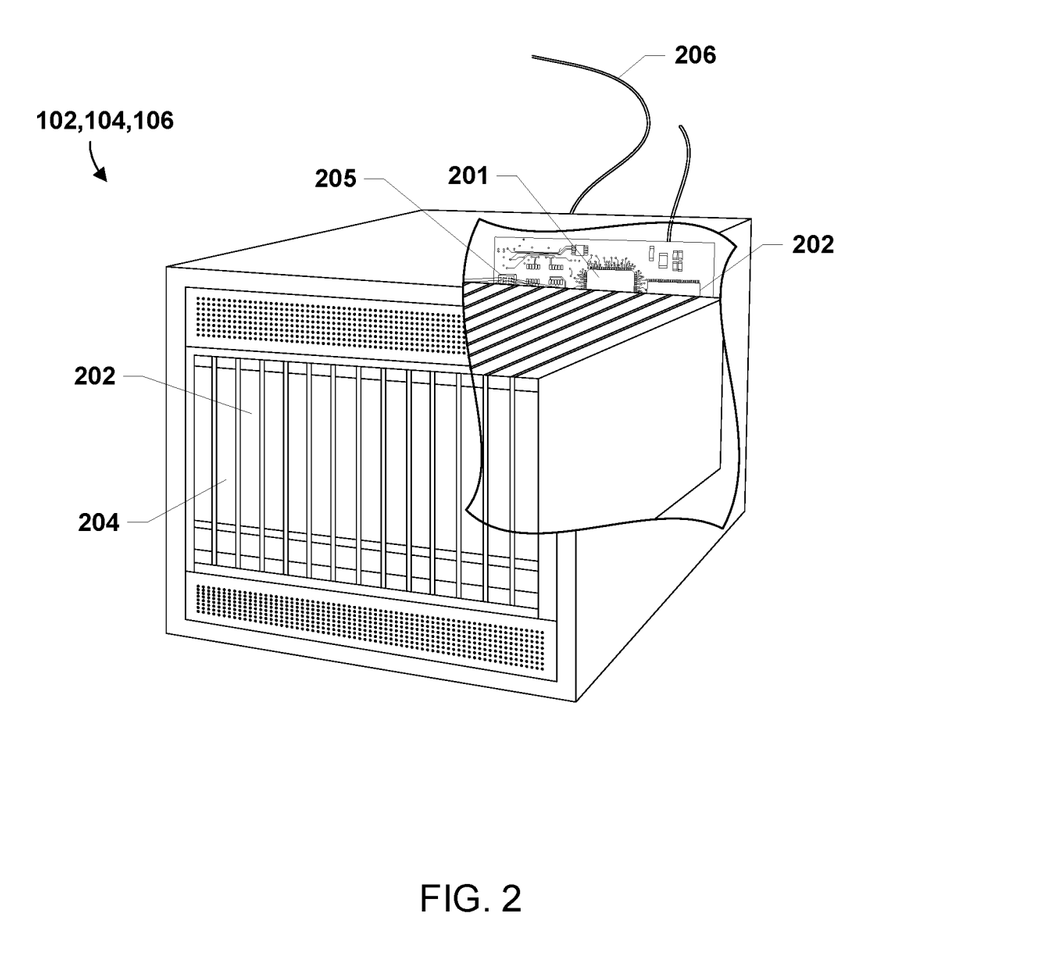
FIG. 2 is a component block diagram illustrating components of a network element suitable for implementing various embodiments.

Various embodiments may employ a computing device as a DNS network element of a communication network. Such DNS network elements may typically include at least the components illustrated in FIG. 2, which illustrates an example DNS network element 102, 104, 106. With reference to FIGS. 1 and 2, the DNS network element 102, 104, 106 may include a processor 201 coupled to volatile memory 202 and a large capacity nonvolatile memory, such as a disk drive 203. The network element 102, 104, 106 may also include a peripheral memory access device such as a floppy disc drive, compact disc (CD) or digital video disc (DVD) drive 206 coupled to the processor 201. The network element 102, 104, 106 may also include network access ports 204 (or interfaces) coupled to the processor 201 for establishing data connections with a network, such as the Internet and/or a local area network coupled to other system computers and servers. Similarly, the network element 102, 104, 106 may include additional access ports, such as USB, Firewire, Thunderbolt, and the like for coupling to peripherals, external memory, or other devices.

Figure 3:
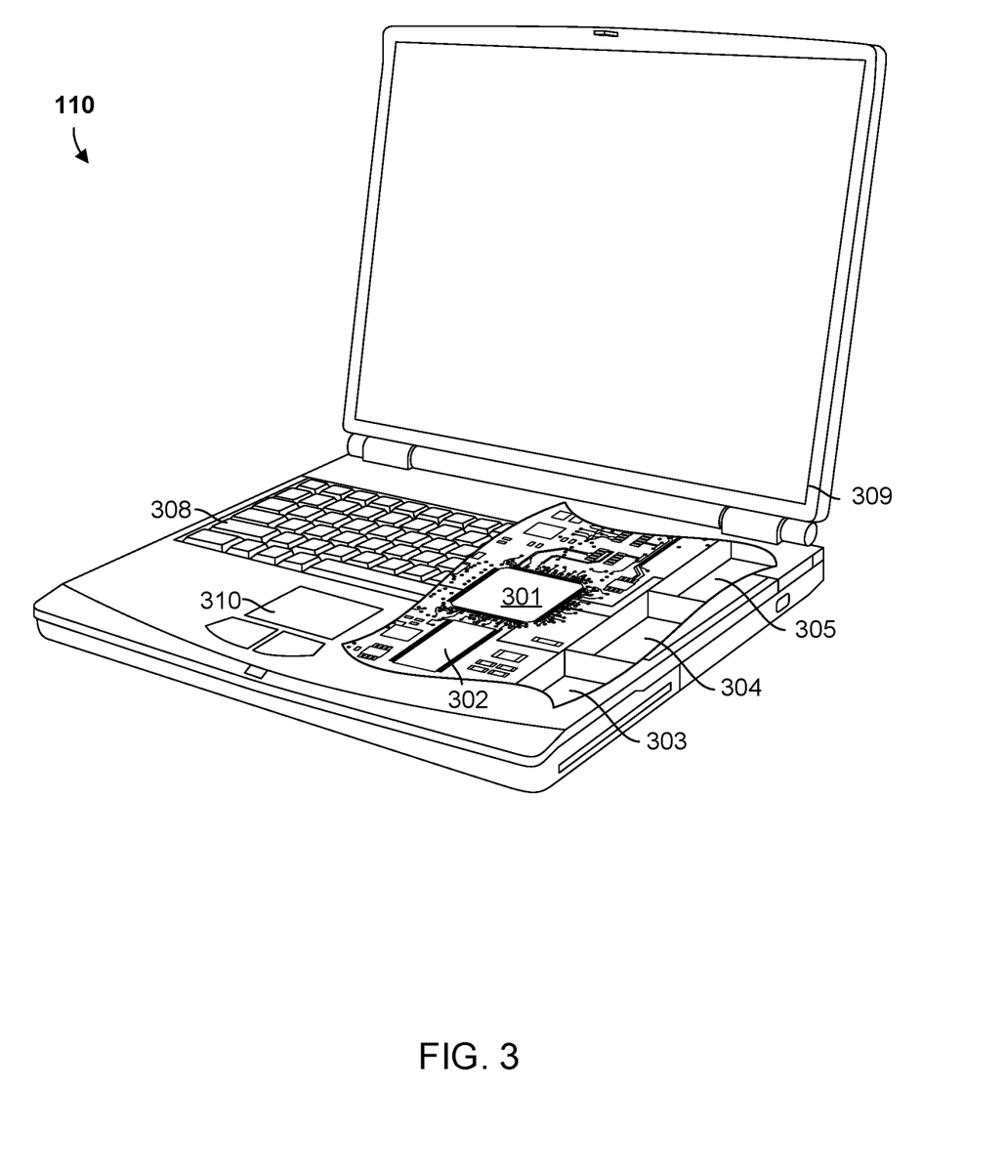
FIG. 3 is a component block diagram illustrating components of a portable computing device suitable for implementing various embodiments.
Figure 4:
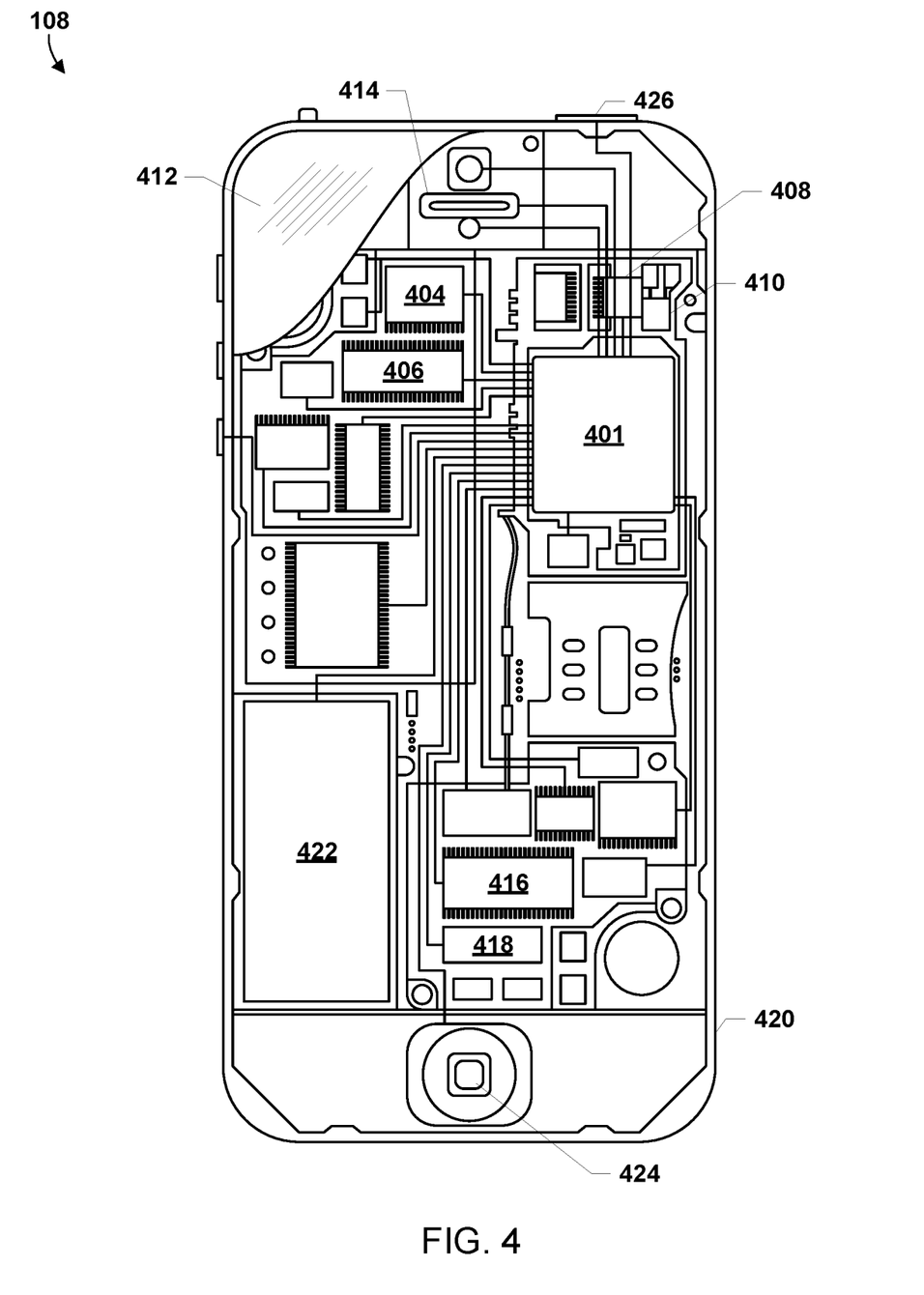
FIG. 4 is a component block diagram illustrating components of a portable computing device suitable for implementing various embodiments.

Various embodiments may be implemented in any of a variety of computing devices, examples of which (e.g., a portable computing device 110 and a mobile computing device 108) are illustrated in FIGS. 3 and 4.

With reference to FIG. 3, the portable computing device 110 may include a processor 301 coupled to volatile memory 302 and a large capacity nonvolatile memory, such as a disk drive 303. The portable computing device 110 may also include a compact disc (CD) and/or DVD drive 304 coupled to the processor 301. The portable computing device 110 may also include a number of connector ports coupled to the processor 301 for establishing data connections or receiving external memory devices, such as a network connection circuit 305 for coupling the processor 301 to a network. The portable computing device 110 may further be coupled to a keyboard 308, a pointing device such as a mouse 310, and a display 309 as is well known in the computer arts.

With reference to FIG. 4, the mobile computing device 108 may include a processor 401 coupled to a touchscreen controller 404 and an internal memory 406. The processor 401 may be one or more multi-core integrated circuits designated for general or specific processing tasks. The internal memory 406 may be volatile or non-volatile memory, and may also be secure and/or encrypted memory, or unsecure and/or unencrypted memory, or any combination thereof. The touchscreen controller 404 and the processor 401 may also be coupled to a touchscreen panel 412, such as a resistive-sensing touchscreen, capacitive-sensing touchscreen, infrared sensing touchscreen, etc. Additionally, the display of the mobile computing device 106 need not have touch screen capability.

The mobile computing device 108 may have two or more radio signal transceivers 408 (e.g., Peanut, Bluetooth, Zigbee, Wi-Fi, RF radio) and antennae 410, for sending and receiving communications, coupled to each other and/or to the processor 401. The transceivers 408 and antennae 410 may be used with the above-mentioned circuitry to implement the various wireless transmission protocol stacks and interfaces. The mobile computing device 108 may include one or more cellular network wireless modem chip(s) 416 coupled to the processor and antennae 410 that enables communication via two or more cellular networks via two or more radio access technologies. The mobile computing device 108 may include a peripheral device connection interface 418 coupled to the processor 401. The peripheral device connection interface 418 may be singularly configured to accept one type of connection, or may be configured to accept various types of physical and communication connections, common or proprietary, such as USB, FireWire, Thunderbolt, or PCIe. The peripheral device connection interface 418 may also be coupled to a similarly configured peripheral device connection port (not shown). The mobile computing device 108 may also include speakers 414 for providing audio outputs. The mobile computing device 108 may also include a housing 420, constructed of a plastic, metal, or a combination of materials, for containing all or some of the components discussed herein. The mobile computing device 108 may include a power source 422 coupled to the processor 401, such as a disposable or rechargeable battery. The rechargeable battery may also be coupled to the peripheral device connection port to receive a charging current from a source external to the mobile computing device 106. The mobile computing device 108 may also include a physical button 424 for receiving user inputs. The mobile communication device 108 may also include a power button 426 for turning the portable computing device 104 on and off.

The processors 201, 301 and 401 may be any programmable microprocessor, microcomputer or multiple processor chip or chips that can be configured by software instructions (applications) to perform a variety of functions, including the functions of various embodiments described below. In some mobile devices, multiple processors 301 and 402 may be provided, such as one processor dedicated to wireless communication functions and one processor dedicated to running other applications. Typically, software applications may be stored in the internal memories 302 and 406 before they are accessed and loaded into the processor 201, 301, 401. The processor 201, 301, 401 may include internal memory sufficient to store the application software instructions.

Figure 5:
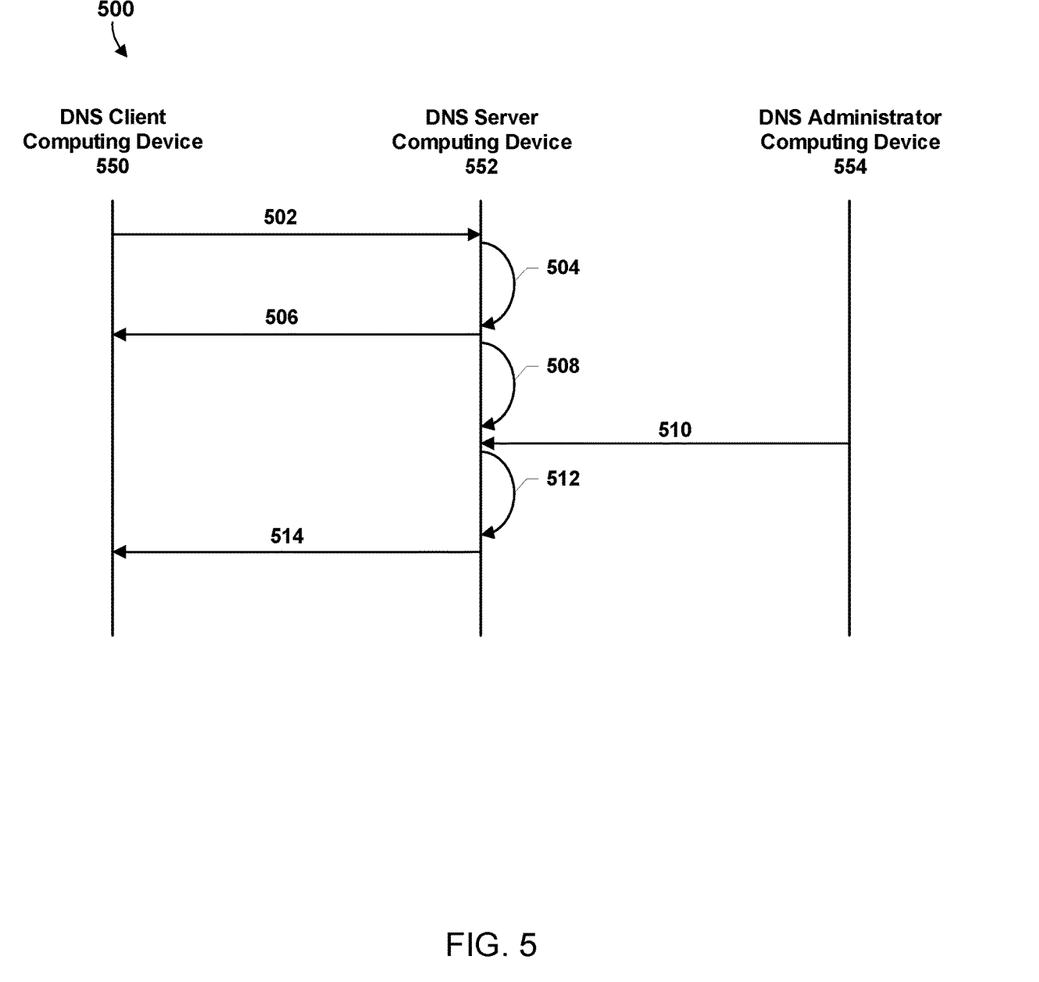
FIG. 5 is a message flow diagram illustrating a method of updating a resource address according to various embodiments.

FIG. 5 is a message flow diagram illustrating a method 500 of updating a resource address according to various embodiments. With reference to FIGS. 1-5, the operations of the method 500 may, for example, be implemented in hardware components and/or software components of a computing device (e.g., the DNS client computing device 550, the DNS server computing device 552, and the DNS administrator computing device 554), the operation of which may be controlled by one or more processors (e.g., the processors 201, 301, 401, and/or the like).

The DNS client computing device 550 (e.g., the computing device 108, 110, or the network element 106) may send a request 502 for a resource address to a DNS server computing device 552 (e.g., the network element 102). In some embodiments, the request 502 may include a request for a fully qualified domain name.

The DNS server computing device 552 may perform a search 504 for the requested resource address. In some embodiments, the DNS server computing device 552 may search for the requested resource address in a zone file (e.g., a DNS zone file). In some embodiments, the DNS server computing device 552 may assign a time-to-live (TTL) to the requested resource address.

The DNS server computing device 552 may send a response 506 (e.g., a DNS response) to the DNS client computing device 550. In some embodiments, the response 506 may include a fully qualified domain name. In some embodiments, the response 506 may include the assigned TTL. In some embodiments, the response 506 may include an indication that the DNS server computing device 552 cannot determine the requested resource address (e.g., a non-existent domain indication, such as NXDOMAIN).

Figure 6:
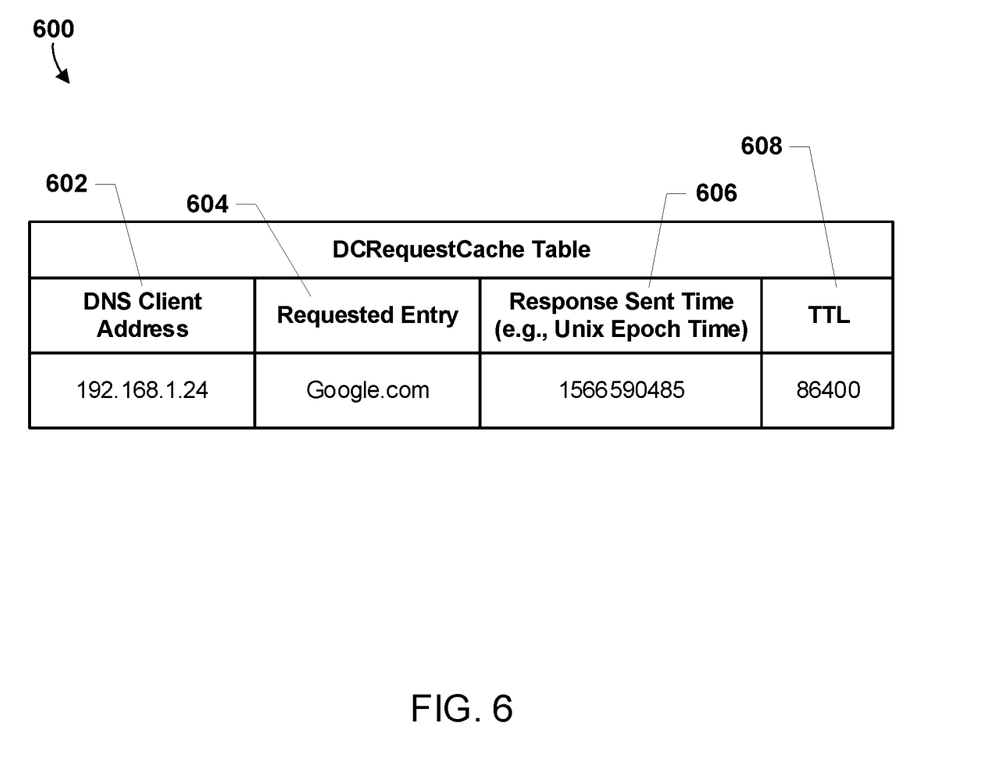
FIG. 6 illustrates a data structure suitable for implementing various embodiments.

The DNS server computing device 552 may store 508 in a memory an address for the DNS client computing device 550, the requested resource address, the assigned TTL, and a time that the response 506 was transmitted by the DNS server computing device 552. In some implementations, the DNS server computing device 552 may store one or more of such information elements in a data structure. For example, FIG. 6 illustrates a data structure 600 suitable for implementing various embodiments. The data structure 600 may include an identifier of the requesting device 602 (e.g., a DNS client address of the DNS client computing device 550), a requested entry 604 (e.g., a requested resource address), a response sent time 606, and an assigned TTL 608. The DNS client address 602 may include, for example, an IP address of the DNS client that requested the resource address (e.g., the DNS client computing device 550). The requested entry 604 may include, for example, a resource identifier of the requested resource address (e.g., a uniform resource identifier (URI) or a uniform resource locator (URL)). The response sent time 606 may include a timestamp or other indication of a time at which the response 506 was sent by the DNS server computing device 552. The TTL 608 may include a period of time during which the resource address should be considered valid by the DNS client computing device 550.

Returning to FIG. 5, a DNS administrator computing device 554 may send an update message 510 to the DNS server computing device 552. In some embodiments, the update message 510 may include a changed, updated, or modified resource address (e.g., the requested entry 604) for the requested resource.

The DNS server computing device 552 may determine 512 that the address of the previously requested resource has changed within the TTL. For example, the DNS server computing device 552 may check DNS entries that were changed based on the update message 510, and may determine that the resource address that was requested by the request 502 was changed based on the update message 510. The DNS server computing device 552 may determine the TTL associated with the changed resource address, and may determine that the resource address has changed within the TTL. The DNS server computing device 552 may determine an identifier of the computing device that requested the resource address (e.g., the identifier 602 of the DNS client computing device 550).

The DNS server computing device 552 may send the changed resource address to the DNS computing device 550 in notification message 514. In some embodiments, the DNS server computing device 552 may send the changed resource address to the DNS computing device 550 in notification message 514 based on the determination that the resource address has changed within the TTL. For example, having determined that the resource address has changed within the TTL, the DNS server computing device 552 may send a "push update" to the DNS client computing device 550 at the DNS client address indicated in the data structure 600.

Figure 7:
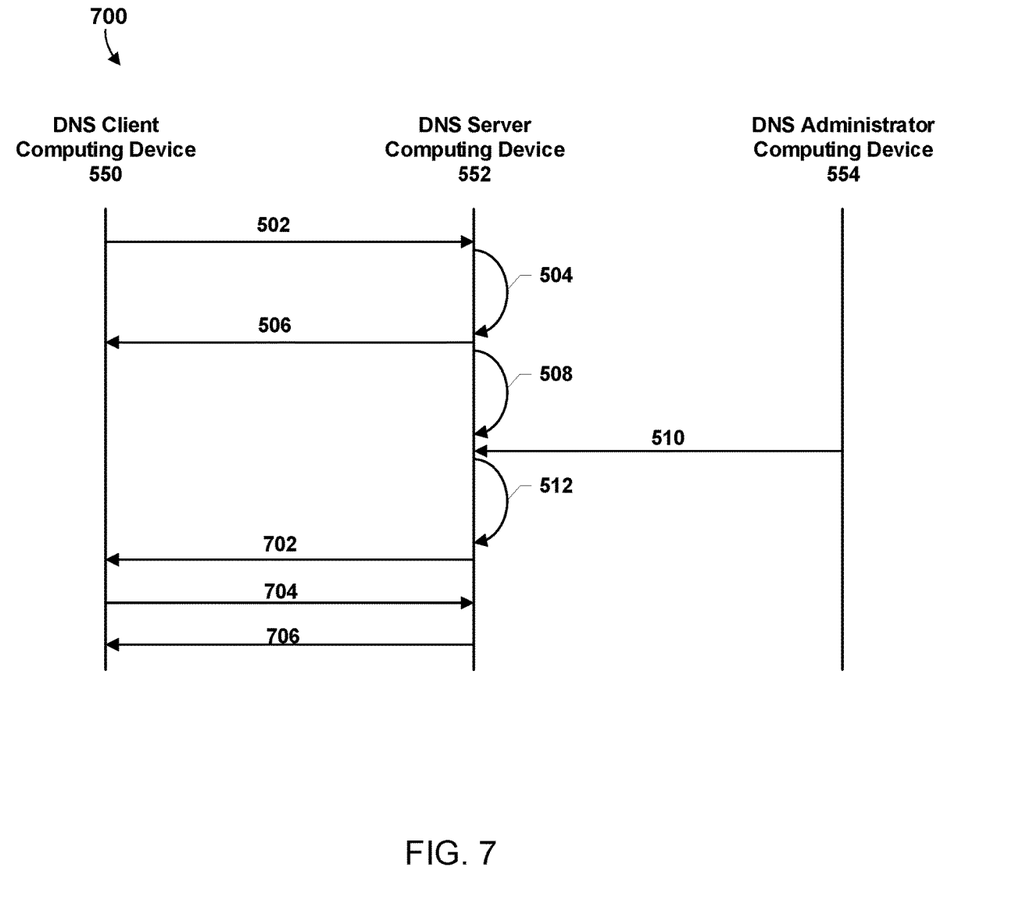
FIG. 7 is a message flow diagram illustrating a method of updating a resource address according to various embodiments.

FIG. 7 is a message flow diagram illustrating a method 700 of updating a resource address according to various embodiments. With reference to FIGS. 1-7, the operations of the method 700 may, for example, be implemented in hardware components and/or software components of a computing device (e.g., the DNS client computing device 550, the DNS server computing device 552, and the DNS administrator computing device 554), the operation of which may be controlled by one or more processors (e.g., the processors 201, 301, 401, and/or the like). In operations 502-512, the processor of the computing device(s) may perform operations of like-numbered blocks of the method 500 as described.

Following the operations of determination 512, the DNS server computing device 552 may send a notification message 702 to the DNS client computing device 550 indicating that the resource address has changed. In some embodiments, the notification message 702 may include information identifying the DNS request previously sent by the DNS client computing device 550 (e.g., the request 502). In some embodiments, the notification message 702 may include a DNS RefreshEntry message or another suitable message indicating that one or more resource addresses have changed.

The DNS client computing device 550 may send a request for the changed resource address 704 to the DNS server computing device 552. In some embodiments, the DNS client computing device 50 may send the request 704 in response to receiving the notification message 702. In some embodiments, the request 704 may include a DNS request message. In some embodiments, the DNS request message may be specific to, or may specify, the changed resource address.

The DNS server computing device 552 may send the changed resource address 706 to the DNS client computing device 550. In some embodiments, the DNS server computing device 552 may send the changed resource address 706 and a DNS response message or another suitable message.

Figure 8:
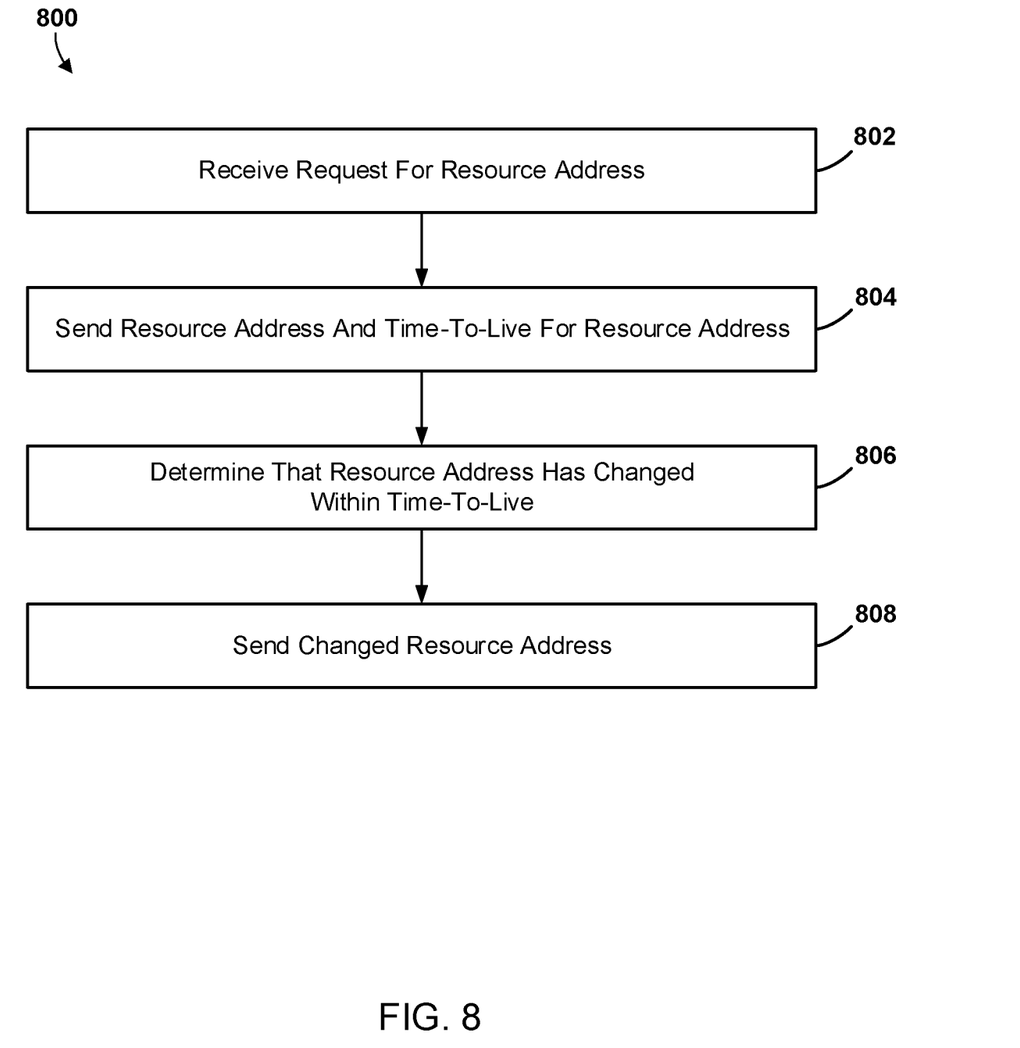
FIG. 8 is a process flow diagram illustrating a method of updating a resource address according to various embodiments.

FIG. 8 is a process flow diagram illustrating a method of updating a resource address according to various embodiments. With reference to FIGS. 1-8, the operations of the method 800 may, for example, be implemented in hardware components and/or software components of a computing device (e.g., the DNS client computing device 550, the DNS server computing device 552, and the DNS administrator computing device 554), the operation of which may be controlled by one or more processors (e.g., the processors 201, 301, 401, and/or the like).

In block 802, the processor may receive a request for a resource address. For example, the processor may receive a request for resource address from the second computing device (e.g., a DNS client computing device).

In block 804, the processor may send to the second computing device the resource address and a time-to-live for the resource address.

In block 806, the processor may determine that the resource address has changed within the time-to-live. In some embodiments, determining that the resource address has changed within the time-to-live may include receiving from a third computing device the changed resource address.

In block 808, the processor may send the changed resource address to the second computing device.

Figure 9:
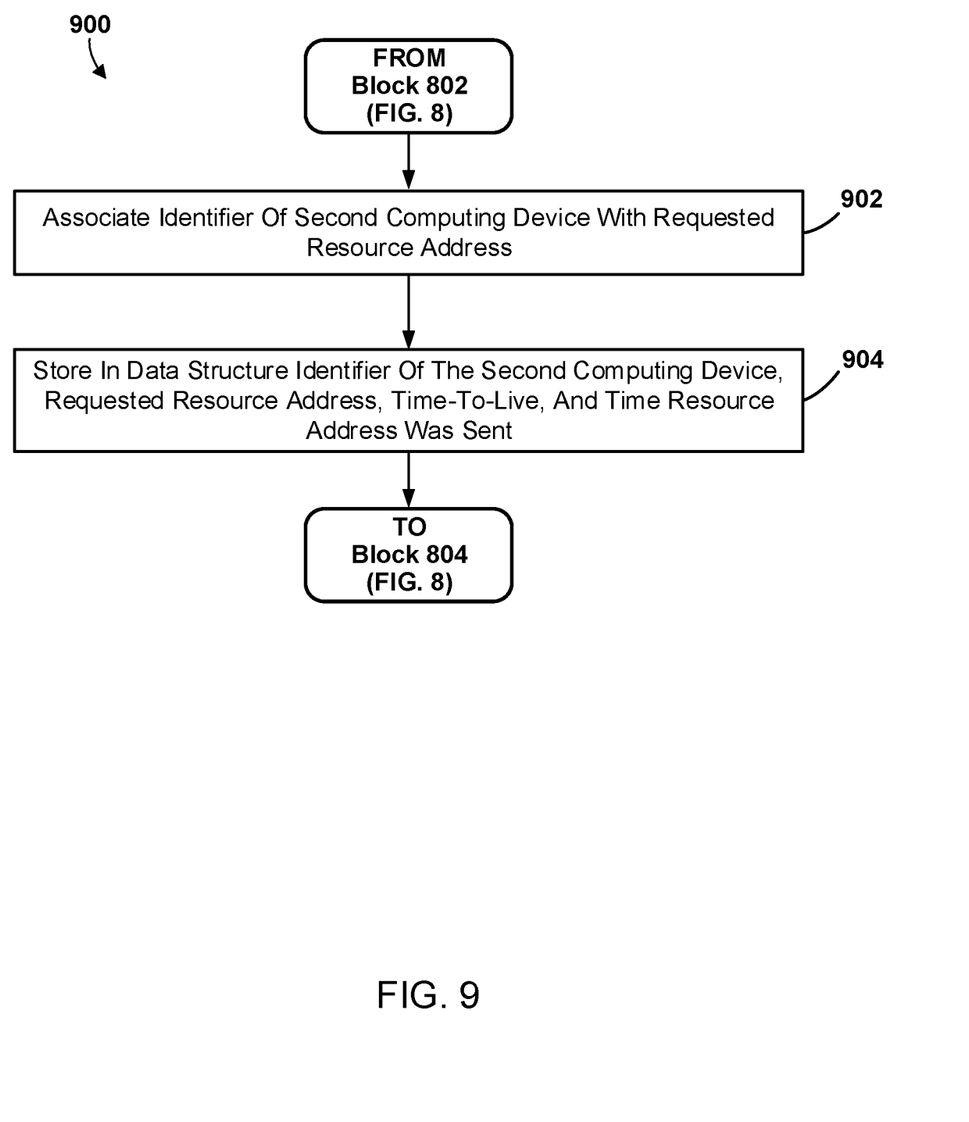
FIG. 9 is a process flow diagram illustrating a method of updating a resource address according to various embodiments.

FIG. 9 is a process flow diagram illustrating operations 900 that may be performed as part of a method of updating a resource address according to various embodiments. With reference to FIGS. 1-9, the operations 900 may, for example, be implemented in hardware components and/or software components of a computing device (e.g., the DNS client computing device 550, the DNS server computing device 552, and the DNS administrator computing device 554), the operation of which may be controlled by one or more processors (e.g., the processors 201, 301, 401, and/or the like).

Following the operations of block 802 (FIG. 8), the processor may associate an identifier of the second computing device with the requested resource address in block 902. In some embodiments, the identifier of the second computing device may include a network address of the second computing device.

In block 904, the processor may store in a data structure the identifier of the second computing device, the requested resource address, the time-to-live, and a time the resource address was sent.

The processor may proceed to perform the operations of block 804 (FIG. 8).

Figure 10:
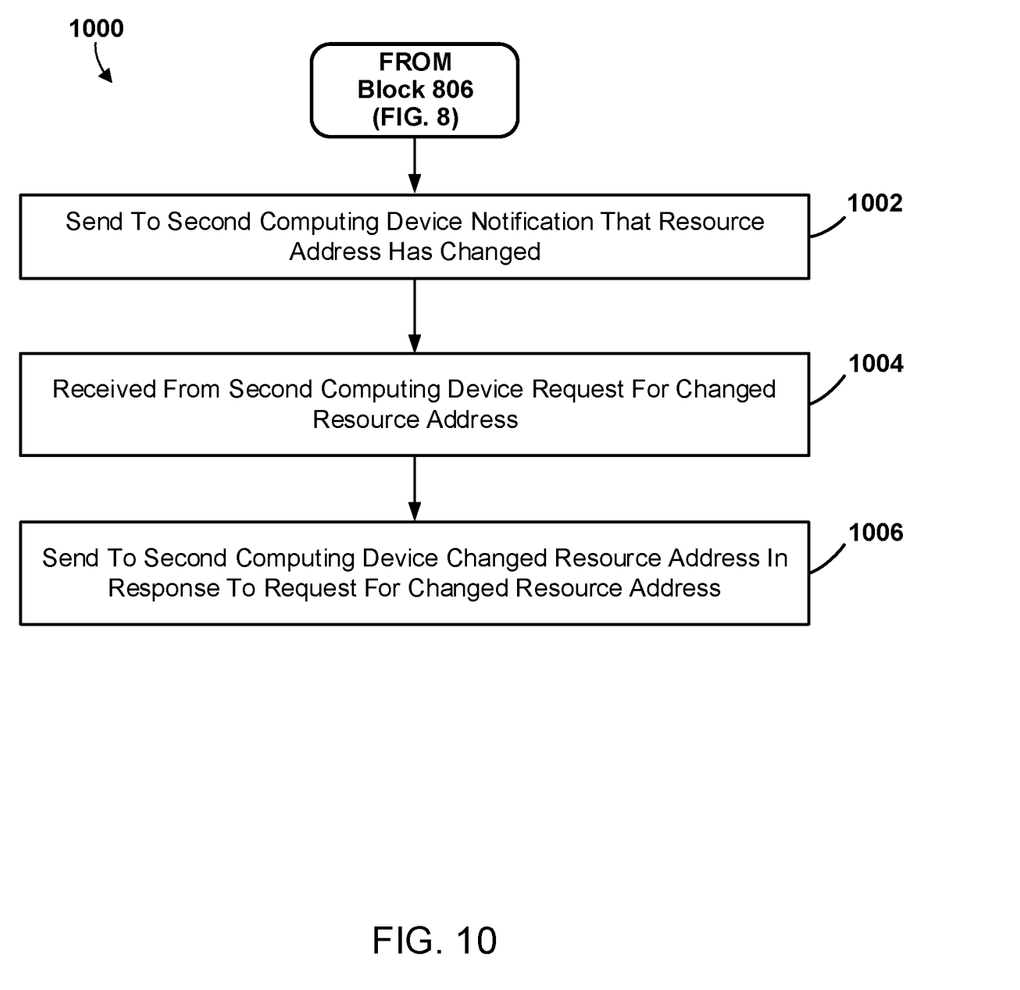
FIG. 10 is a process flow diagram illustrating a method of updating a resource address according to various embodiments.

FIG. 10 is a process flow diagram illustrating operations 1000 that may be performed as part of a method of updating a resource address according to various embodiments. With reference to FIGS. 1-10, the operations 1000 may, for example, be implemented in hardware components and/or software components of a computing device (e.g., the DNS client computing device 550, the DNS server computing device 552, and the DNS administrator computing device 554), the operation of which may be controlled by one or more processors (e.g., the processors 201, 301, 401, and/or the like).

Following the operations of block 806 (FIG. 8), the processor may send to the second computing device a notification that the resource address has changed in block 1002.

In block 1004, the processor may receive from the second computing device a request for the changed resource address.

In block 1006, the processor may send to the second computing device the changed resource address in response to the request for the changed resource address.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations, or operations of the methods, 500, 700, 800, 900, and 1000 may be substituted for or combined with one or more operations of the operation/methods 500, 700, 800, 900, and 1000, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of updating a resource address performed by a processor of a computing device, comprising:

receiving by the computing device a request for a resource address from a second computing device;

sending from the computing device to the second computing device the resource address and a time-to-live for the resource address;

receiving by the computing device from a third computing device an update message indicating that the resource address has changed;

determining by the computing device that the resource address has changed within the time-to-live based on the update message from the third computing device; and sending the changed resource address from the computing device to the second computing device in response to determining by the computing device that the resource address has changed within the time-to-live.

2. The method of claim 1, further comprising:
associating an identifier of the second computing device with the requested resource address; and
storing in a data structure the identifier of the second computing device, the requested resource address, the time-to-live, and a time the resource address was sent.

3. The method of claim 2, wherein the identifier of the second computing device comprises a network address of the second computing device.

4. The method of claim 1, wherein sending to the second computing device the changed resource address comprises:
sending to the second computing device a notification that the resource address has changed;
receiving from the second computing device a request for the changed resource address; and
sending to the second computing device the changed resource address in response to the request for the changed resource address.

5. The method of claim 1, wherein the computing device comprises a domain name server (DNS) network element.

6. A computing device, comprising:
a network interface; and
a processor coupled to the network interface and configured with processor-executable instructions to perform operations comprising:
receiving a request for a resource address from a second computing device;
sending to the second computing device the resource address and a time-to-live for the resource address;
receiving from a third computing device an update message indicating that the resource address has changed;
determining that the resource address has changed within the time-to-live based on the update message from the third computing device; and
sending the changed resource address to the second computing device in response to determining that the resource address has changed within the time-to-live.

7. The computing device of claim 6, the processor is configured with processor-executable instructions to perform operations further comprising:
associating an identifier of the second computing device with the requested resource address; and
storing in a data structure the identifier of the second computing device, the requested resource address, the time-to-live, and a time the resource address was sent.

8. The computing device of claim 7, wherein the processor is configured with processor-executable instructions to perform operations such that the identifier of the second computing device comprises a network address of the second computing device.

9. The computing device of claim 6, wherein the processor is configured with processor-executable instructions to perform operations such that sending to the second computing device the changed resource address comprises:
sending to the second computing device a notification that the resource address has changed;
receiving from the second computing device a request for the changed resource address; and
sending to the second computing device the changed resource address in response to the request for the changed resource address.

10. The computing device of claim 6, wherein the computing device comprises a domain name server (DNS) network element.

11. A non-transitory computer readable storage medium having stored thereon processor-executable software instructions configured to cause a processor of a computing device to perform operations for updating a resource address, the operations comprising:
receiving a request for a resource address from a second computing device;
sending to the second computing device the resource address and a time-to-live for the resource address;
receiving from a third computing device an update message indicating that the resource address has changed;
determining that the resource address has changed within the time-to-live based on the update message from the third computing device; and
sending the changed resource address to the second computing device in response to determining by the computing device that the resource address has changed within the time-to-live.

12. The non-transitory computer readable storage medium of claim 11, wherein the stored processor-executable software instructions are configured to cause the processor of the computing device to perform operations further comprising:
associating an identifier of the second computing device with the requested resource address; and
storing in a data structure the identifier of the second computing device, the requested resource address, the time-to-live, and a time the resource address was sent.

13. The non-transitory computer readable storage medium of claim 12, wherein the stored processor-executable software instructions are configured to cause the processor of the computing device to perform operations such that the identifier of the second computing device comprises a network address of the second computing device.

14. The non-transitory computer readable storage medium of claim 11, wherein the stored processor-executable software instructions are configured to cause the processor of the computing device to perform operations such that sending to the second computing device the changed resource address comprises:
sending to the second computing device a notification that the resource address has changed;
receiving from the second computing device a request for the changed resource address; and
sending to the second computing device the changed resource address in response to the request for the changed resource address.

15. The non-transitory computer readable storage medium of claim 11, wherein the computing device comprises a domain name server (DNS) network element.

* * * * *